United States Patent
Jean et al.

(10) Patent No.: US 12,477,645 B2
(45) Date of Patent: Nov. 18, 2025

(54) WIRELESS REMOTE CONTROLLER PAIRING SYSTEM FOR MARINE SEARCHLIGHT AND METHOD THEREOF

(71) Applicant: Wen-Fong Jean, Taoyuan (TW)

(72) Inventors: Wen-Fong Jean, Taoyuan (TW);
Da-Zen Jean, Taoyuan (TW);
Han-Wen Cheng, New Taipei (TW);
Sen-Hung Chen, Taoyuan (TW)

(73) Assignee: Wen-Fong Jean, Taoyuan (TW)

( * ) Notice: Subject to any disclaimer, the term of this patent is extended or adjusted under 35 U.S.C. 154(b) by 0 days.

(21) Appl. No.: 18/932,190

(22) Filed: Oct. 30, 2024

(65) Prior Publication Data
US 2025/0247935 A1    Jul. 31, 2025

(30) Foreign Application Priority Data
Jan. 26, 2024    (TW) ................ 113103050

(51) Int. Cl.
| | |
|---|---|
| F21V 23/04 | (2006.01) |
| F21V 21/15 | (2006.01) |
| F21W 107/20 | (2018.01) |
| H05B 47/175 | (2020.01) |
| H05B 47/19 | (2020.01) |

(52) U.S. Cl.
CPC ........... *H05B 47/199* (2024.01); *F21V 21/15* (2013.01); *F21V 23/0435* (2013.01); *H05B 47/19* (2020.01); *F21W 2107/20* (2018.01)

(58) Field of Classification Search
CPC ....... F21V 23/0435; F21S 8/003; B60Q 1/245
See application file for complete search history.

(56) References Cited

U.S. PATENT DOCUMENTS

| | | | | |
|---|---|---|---|---|
| 5,584,560 A | * | 12/1996 | Gosswiller | B60Q 1/245 |
| | | | | 362/523 |
| 7,296,917 B1 | * | 11/2007 | Chiu | B60Q 1/245 |
| | | | | 362/512 |

(Continued)

FOREIGN PATENT DOCUMENTS

| | | |
|---|---|---|
| CN | 105698069 A | 6/2016 |
| CN | 105959752 A | 9/2016 |

(Continued)

*Primary Examiner* — Eric T Eide
(74) *Attorney, Agent, or Firm* — KIRTON McCONKIE; Evan R. Witt

(57) ABSTRACT

The disclosure relates to a wireless remote controller pairing system for marine searchlight and a method thereof. The system includes a main body assembly and a wireless remote controller. The main body assembly includes a control motherboard issuing a control internal code within a control distance when a pairing process is activated. The control motherboard is allowed to receive a control signal based on the control internal code for controlling a driving module to drive a lighting module. The wireless remote controller includes a microcontroller unit for receiving the control internal code and storing it in a memory. After pairing, the control internal code is stored in the wireless remote controller. The wireless remote controller is allowed to send the control signal to the control motherboard, so that the control motherboard correspondingly controls the lighting module and the driving module to adjust an irradiation angle of the irradiation light source.

18 Claims, 8 Drawing Sheets

(56) References Cited

U.S. PATENT DOCUMENTS

| | | | | |
|---|---|---|---|---|
| 2005/0047142 A1* | 3/2005 | Lui | ........................ | B60Q 1/245 |
| | | | | 362/286 |
| 2006/0232985 A1* | 10/2006 | Wang | ...................... | F21V 14/04 |
| | | | | 362/425 |
| 2009/0009377 A1* | 1/2009 | Chiu | ...................... | B60Q 1/245 |
| | | | | 341/176 |
| 2010/0259945 A1* | 10/2010 | Chiu | ...................... | F21V 21/15 |
| | | | | 341/176 |

FOREIGN PATENT DOCUMENTS

| | | |
|---|---|---|
| CN | 107316452 A | 11/2017 |
| TW | M576767 U | 4/2019 |

* cited by examiner

WIRELESS REMOTE CONTROLLER PAIRING SYSTEM FOR MARINE SEARCHLIGHT AND METHOD THEREOF

CROSS-REFERENCE TO RELATED APPLICATION

This application claims priority to Taiwan Patent Application No. 113103050, filed on Jan. 26, 2024. The entireties of the above-mentioned patent application are incorporated herein by reference for all purposes.

FIELD OF THE INVENTION

The present disclosure relates to a marine searchlight system, and more particularly to a wireless remote controller paring system for marine searchlight and a method thereof for facilitating the installation and effectively increasing the flexibility of operations.

BACKGROUND OF THE INVENTION

Ships need searchlights for lighting when sailing, loading and unloading at night. Furthermore, searchlights are used for light language communication with other ships. Therefore, the searchlights can be regarded as an extremely important equipment on the ship. However, most of the existing searchlights for ships are directly fixed on the deck of the ship, and the remote controller is used to adjust the direction of the searchlight, so that the light is focused on a fixed location or corner.

In the existing technology, the marine searchlights and the wired remote controllers are set at fixed locations on the ships and then connected through physical lines. There is a higher line installation cost, and it is less convenient to adjust or change the settings. Once the wired remote controller or the connecting line fails, the entire connecting lines must be replaced.

In order to solve the installation problem of wired lines and increase the flexibility of operations, some marine searchlight systems on the market are operated through wireless remote controllers. However, in actual application, due to the exclusive relationship between the marine searchlights and the wireless remote controller, one marine searchlight is equipped with one dedicated wireless remote controller when they leave the factory. If the wireless remote controller fails, the user has to purchase the same dedicated wireless remote controller again. Moreover, the number of remote controllers cannot be expanded.

Therefore, it is necessary to provide a wireless remote controller paring system for marine searchlight and a method thereof for facilitating the installation and effectively increasing the flexibility of operations, so as to effectively solve the foregoing problems and overcome the above drawbacks.

SUMMARY OF THE INVENTION

An object of the present disclosure is to provide a wireless remote controller paring system for marine searchlight and a method thereof for facilitating the installation and effectively increasing the flexibility of operations. The control motherboard in the main body assembly has a control internal code. The control internal code is issued within a control distance when a pairing process is activated. The control motherboard is allowed to receive a control signal based on the control internal code for controlling a driving module to drive a lighting module in the main body assembly When the pairing process is activated, the wireless remote controller located within the control distance can receive and store the control internal code into the memory by long pressing the power button to complete the pairing process. The wireless remote controller having the control internal code stored therein allows sending the control signal to the control motherboard based on the control internal code, so that the control motherboard can correspondingly control the lighting module and the driving module of the main body assembly to adjust an irradiation angle of the irradiation light source. The control motherboard of the main body assembly and the microcontroller unit of the wireless remote controller are in communication through radio frequency (RF), Wi-Fi or Bluetooth. After the pairing is completed, the control internal code is stored in the wireless remote controller and there is no need to pair it again. It is easy to install and easy to use. Through the pairing method, the wireless remote controller is easy to repair or replace. In addition, the pairing of the main body assembly and the wireless remote controller is not limited to one-to-one. It allows to pair one single main body assembly with a plurality of wireless remote controller through multiple pairing processes. The plurality of wireless remote controllers allow sending the control signals to the control motherboard of the main body assembly, and the control motherboard can confirm the control priority of the plurality of wireless remote controllers based on the control signals received, so that the control flexibility of marine searchlights is improved.

Another object of the present disclosure is to provide a wireless remote controller paring system for marine searchlight and a method thereof. By issuing and storing the control internal code to establish a pairing relationship between the main body assembly and the wireless remote controller, it helps to solve the inconvenience of using the conventional remote controllers. Moreover, the paring relationship between the main body assembly and the wireless remote controller is adjustable according to the practical requirements. The control motherboard can determine the control priority of the plurality of wireless remote controllers based on the control internal code, so as to modulate the irradiation angle of the irradiation light source. The pairing of the wireless remote controller and the control motherboard does not require complicated wire installation. The wireless remote controller allows operating the direction buttons or the speed switches to generate the control signal for transmitting based on the control internal code stored therein, and then the control signal is received and confirmed by the control motherboard. Thereby, the driving module with at least two degrees of freedom is controlled to drive the lighting module to rotate horizontally and vertically relative to the base, and the irradiation angle of the irradiation light source is modulated. On the other hand, the control motherboard and the wireless remote controller are paired based on the control internal code and the pairing relationship therebetween is not limited to one-to-one exclusive pairing. The overall installation cost is low and the modulation flexibility is high. In addition, the pairing method of the control motherboard and the wireless remote controller can also be used to quickly find the faulty components. The damaged remote controller can also be directly replaced and paired again. Certainly, the number of the wireless remote controllers paired with the signal main body assembly is adjustable according to the practical requirements, so as to increase the control flexibility of the marine searchlight system, and improve the industrial utilization.

According to an aspect of the present disclosure, a wireless remote controller paring system for marine searchlight is provided. The wireless remote controller paring system for marine searchlight includes a main body assembly and at least one wireless remote controller. The main body assembly includes a base, a light module, a driving module and a control motherboard. The base is configured to fix to a ship hull. The lighting module is configured to provide an irradiation light source. The driving module is disposed between the base and the lighting module and configured to drive the lighting module to modulate an irradiation angle of the irradiation light source. The control motherboard is received in the base, electrically connected to the lighting module and the driving module, and configured to control the driving module and the lighting module. The control motherboard further includes a control internal code, and the control internal code is issued within a control distance when a pairing process is activated, wherein the control motherboard is allowed to receive a control signal based on the control internal code for controlling the driving module to drive the lighting module. The at least one wireless remote controller includes a microcontroller unit for receiving the control internal code within the control distance when the pairing process is activated and then storing the control internal code in a memory, wherein the wireless remote controller is allowed to send the control signal to the control motherboard, so that the control motherboard correspondingly controls the lighting module and the driving module.

In an embodiment, each of the control motherboard and the at least one wireless remote controller includes a wireless communication module, and the wireless communication modules transmit the control internal code and the control signal through radio frequency (RF), Wi-Fi or Bluetooth.

In an embodiment, the lighting module is disposed on a housing, and the driving module incudes a first driving element, a bracket component and a second driving element, wherein the first driving element is disposed between the base and a bottom end of the bracket component, and configured to drive the bracket component to rotate horizontally relative to the base, wherein the second driving element is disposed between a top end of the bracket component and the housing, and configured to drive the housing to rotate up and down relative to the bracket component.

In an embodiment, the at least one wireless remote controller includes a direction button cooperated with the microcontroller unit to generate the control signal for controlling operations of the first driving element or/and the second driving element, so that the lighting module and the housing are rotated horizontally or/and vertically relative to the base, and the irradiation angle of the irradiation light source is modulated.

In an embodiment, the at least one wireless remote controller includes a power button cooperated with the microcontroller unit to generate the control signal for controlling the lighting module to turn on or turn off the irradiation light source.

In an embodiment, when the pairing process is activated, the at least one wireless remote controller located within the control distance receives and stores the control internal code into the memory by long pressing the power button, so as to complete the pairing process.

In an embodiment, the at least one wireless remote controller includes a speed switch cooperated with the microcontroller unit to generate the control signal for controlling rotational speeds of the lighting module and the housing driven by the first driving element and the second driving element relative to the base.

According to another aspect of the present disclosure, a wireless remote controller pairing method for marine searchlight is provided. The wireless remote controller pairing method for marine searchlight includes steps of: (a) providing a main body assembly including a base, a lighting module, a driving module and a control motherboard, wherein the driving module is disposed between the base and the lighting module and configured to drive the lighting module, and the control motherboard is received in the base, electrically connected to the lighting module and the driving module, and configured to control the driving module and the lighting module, wherein the control motherboard further includes a control internal code, and the control motherboard is allowed to receive a control signal based on the control internal code for controlling the driving module to drive the lighting module; (b) activating a pairing process through the control motherboard and issuing the control internal code within a control distance; (c) providing at least one wireless remote controller, wherein when the pairing process is activated, the at least one wireless remote controller located within the control distance receives the control internal code and stores the control internal code into the memory; and (d) stopping the pairing process through the control motherboard, and allowing the control motherboard to receive a control signal transmitted from the at least one wireless remote controller having the control internal code stored therein, so that the control motherboard correspondingly controls the lighting module and the driving module.

In an embodiment, when the main body assembly is powered on, the control motherboard is started to activate the pairing process and issue the control internal code in the step (b).

In an embodiment, a power button of the at least one wireless remote controller located within the control distance is long pressed for a pairing time, so as to receive and store the control internal code.

In an embodiment, the pairing process lasts 10 minutes, the control distance is 5 meters, and the pairing time is 5 seconds.

In an embodiment, the at least one wireless remote controller includes a displaying module configured to indicate whether the at least one wireless remote controller has completed receiving and storing the control internal code in the step (c).

In an embodiment, each of the control motherboard and the at least one wireless remote controller includes a wireless communication module, and the wireless communication modules transmit the control internal code and the control signal through radio frequency (RF), Wi-Fi or Bluetooth.

In an embodiment, the lighting module is disposed on a housing, and the driving module includes a first driving element, a bracket component and a second driving element, wherein the first driving element is disposed between the base and a bottom end of the bracket component, and configured to drive the bracket component to rotate horizontally relative to the base, wherein the second driving element is disposed between a top end of the bracket component and the housing, and configured to drive the housing to rotate up and down relative to the bracket component.

In an embodiment, the at least one wireless remote controller includes a direction button cooperated with the microcontroller unit to generate the control signal for controlling operations of the first driving element or/and the second driving element, so that the lighting module and the housing are rotated horizontally or/and vertically relative to the base, and the irradiation angle of the irradiation light source is modulated.

In an embodiment, the at least one wireless remote controller includes a power button cooperated with the microcontroller unit to generate the control signal for controlling the lighting module to turn on or turn off the irradiation light source.

In an embodiment, the at least one wireless remote controller located within the control distance receives and stores the control internal code into the memory by long pressing the power button in the step (c).

In an embodiment, the at least one wireless remote controller includes a speed switch cooperated with the microcontroller unit to generate the control signal for controlling rotational speeds of the lighting module and the housing driven by the first driving element and the second driving element relative to the base.

The above objects and advantages of the present disclosure become more readily apparent to those ordinarily skilled in the art after reviewing the following detailed description and accompanying drawings, in which:

DETAILED DESCRIPTION OF THE PREFERRED EMBODIMENT

Figure 1:
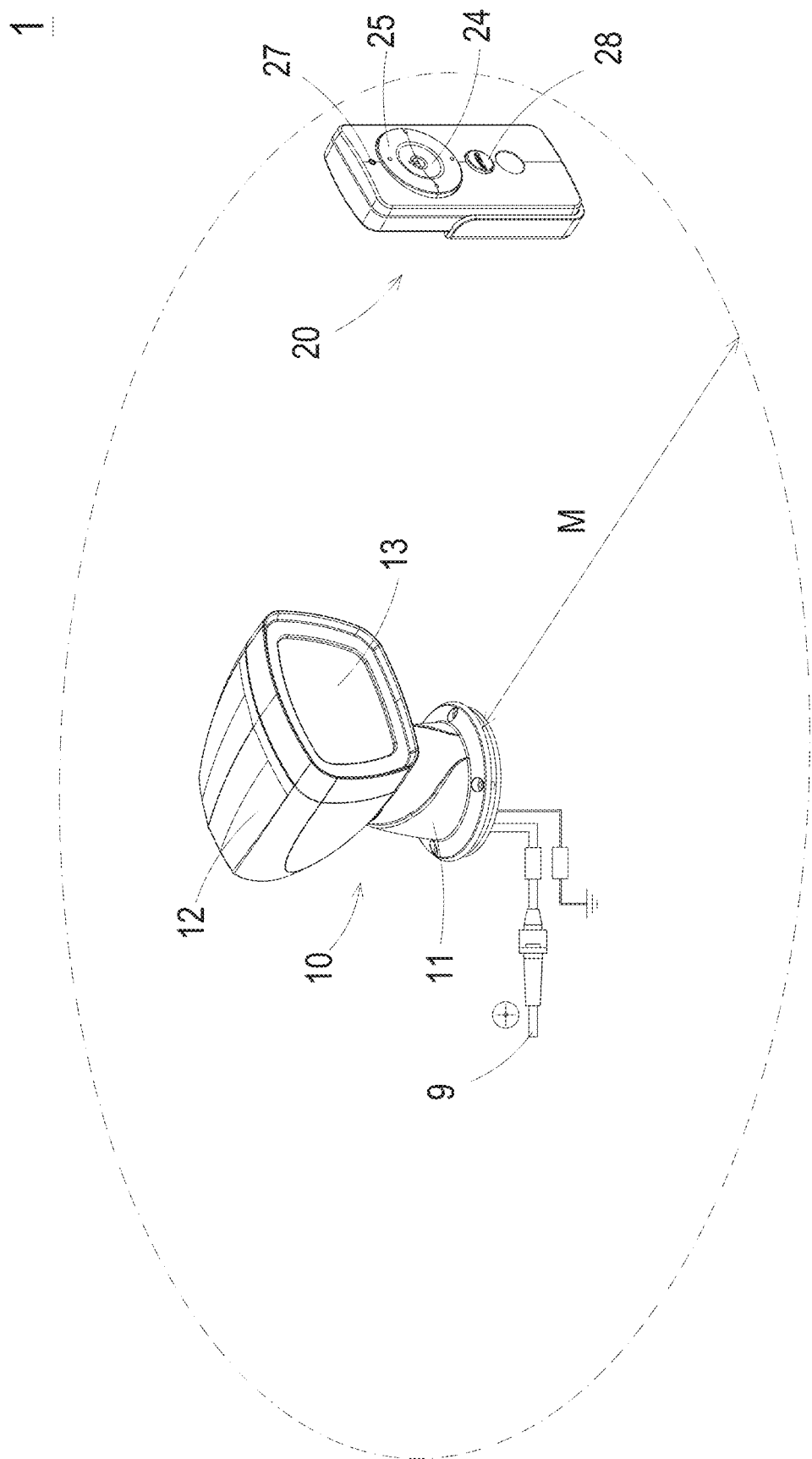
FIG. 1 is a schematic structural diagram showing a wireless remote controller pairing system for marine searchlight according to a first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "upper," "lower," "top," "bottom," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments.

Figure 2:
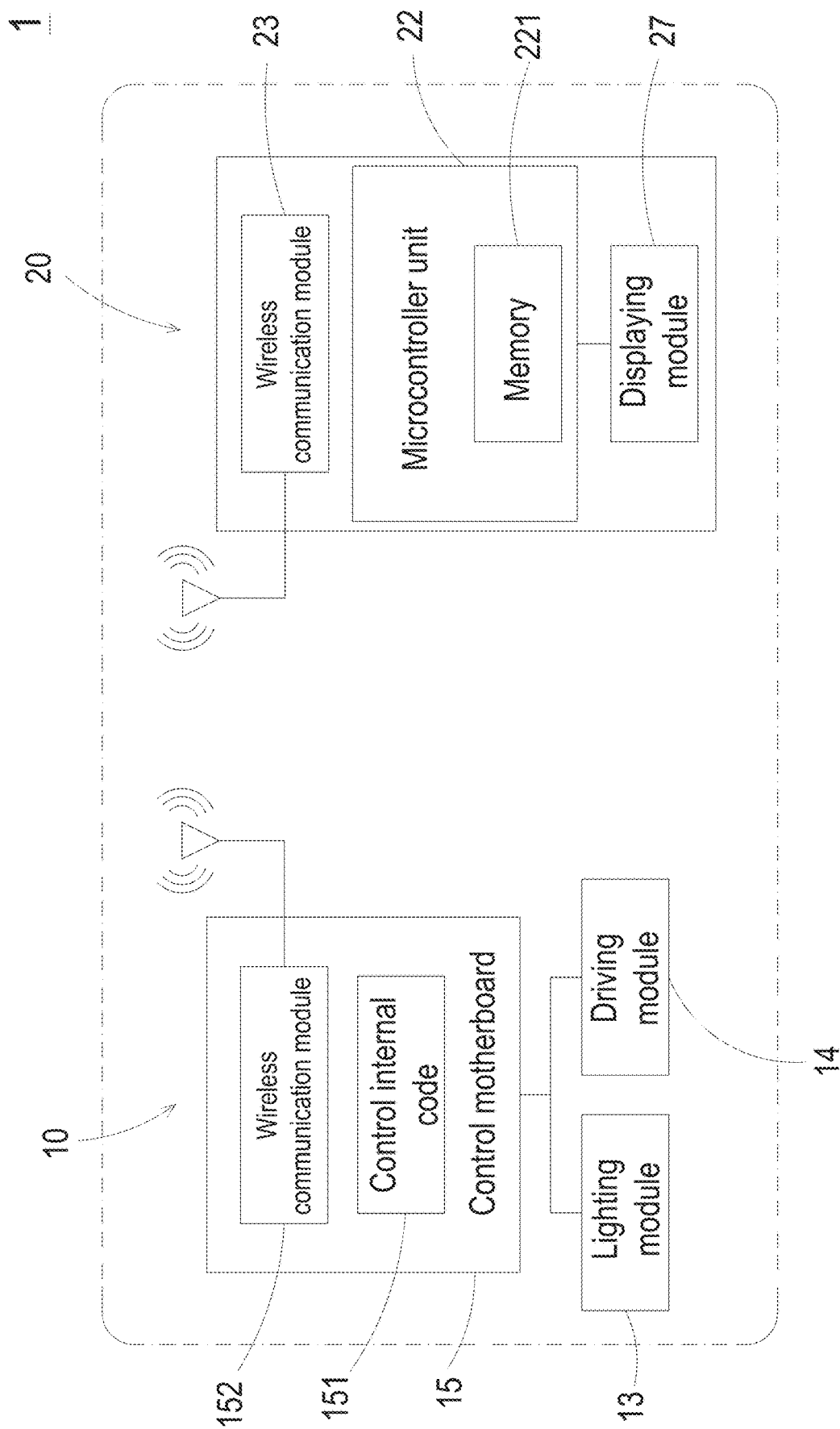
FIG. 2 is a functional block diagram showing the wireless remote controller pairing system for marine searchlight according to the first embodiment of the present disclosure.
Figure 3:
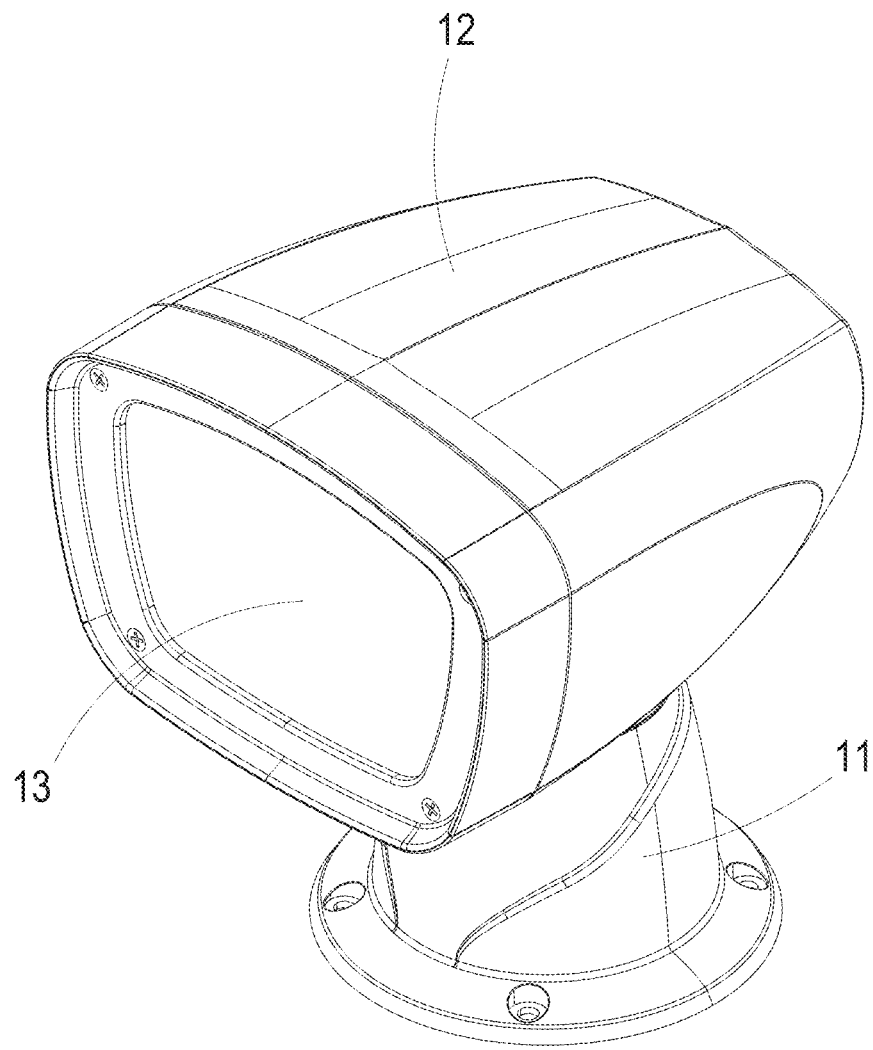
FIG. 3 is a perspective view illustrating the main body assembly of the wireless remote controller pairing system for marine searchlight in the present disclosure.
Figure 4:
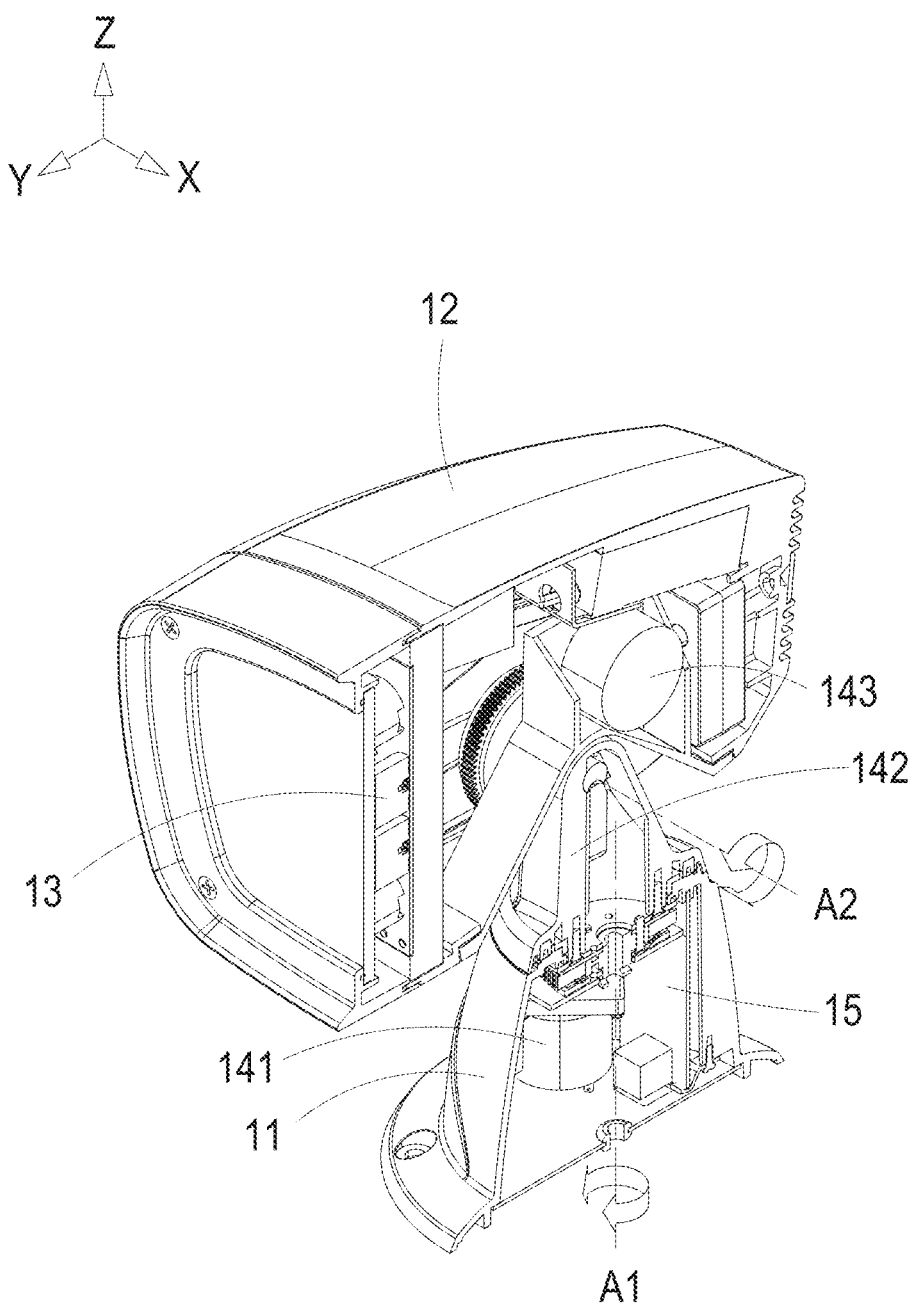
FIG. 4 is a cross-sectional view illustrating the main body assembly of the wireless remote controller pairing system for marine searchlight in the present disclosure.
Figure 5B:
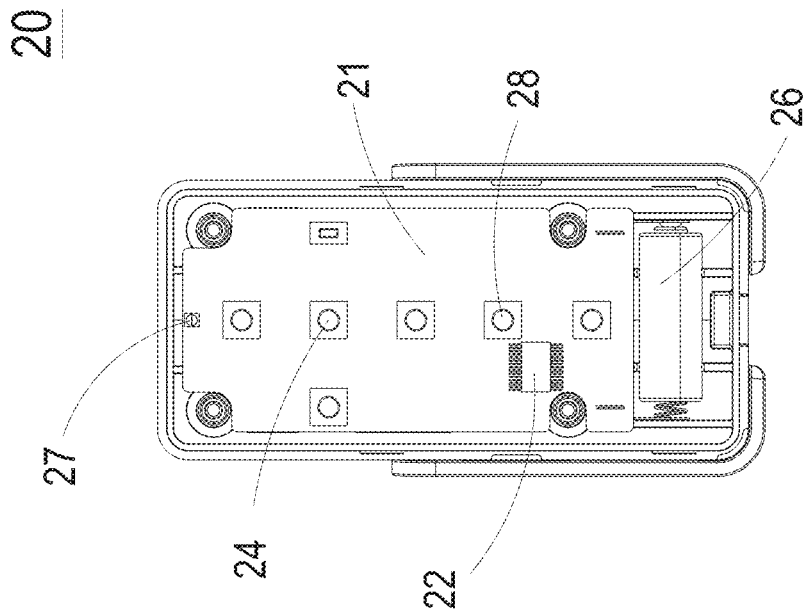
FIG. 5B is a schematic diagram showing the internal structure of the wireless remote controller in the wireless remote controller pairing system for marine searchlight in the present disclosure.
Figure 5A:
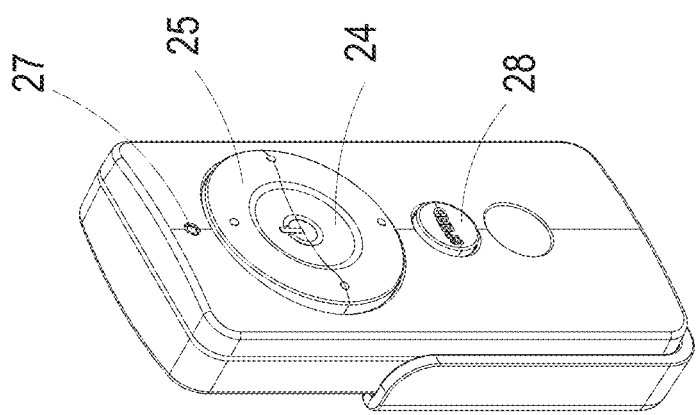
FIG. 5A is a schematic diagram showing the appearance and structure of the wireless remote controller in the wireless remote controller pairing system for marine searchlight in the present disclosure.

FIG. 1 is a schematic structural diagram showing a wireless remote controller pairing system for marine searchlight according to a first embodiment of the present disclosure. FIG. 2 is a functional block diagram showing the wireless remote controller pairing system for marine searchlight according to the first embodiment of the present disclosure. FIG. 3 is a perspective view illustrating the main body assembly of the wireless remote controller pairing system for marine searchlight in the present disclosure. FIG. 4 is a cross-sectional view illustrating the main body assembly of the wireless remote controller pairing system for marine searchlight in the present disclosure. FIG. 5A is a schematic diagram showing the appearance and structure of the wireless remote controller in the wireless remote controller pairing system for marine searchlight in the present disclosure. FIG. 5B is a schematic diagram showing the internal structure of the wireless remote controller in the wireless remote controller pairing system for marine searchlight in the present disclosure. In the embodiment, the present disclosure provides a wireless remote controller paring system 1 for marine searchlight. The wireless remote controller paring system 1 for marine searchlight includes a main body assembly 10 and at least one wireless remote controller 20. The main body assembly 10 includes a base 11, a light module 13, a driving module 14 and a control motherboard 15. The base 10 is configured to fix to high on the front edge of a ship hull (not shown). The lighting module 13 is configured to provide an irradiation light source. Preferably but not exclusively, in the embodiment, the lighting module 13 is an LED lighting module, a halogen lighting module or a high-intensity discharge (HID) lighting module. The driving module 14 is disposed between the base 11 and the lighting module 13 and configured to drive the lighting module 13 to rotate horizontally or/and vertically, so as to modulate an irradiation angle of the irradiation light source. The control motherboard 15 is received in the base 11, electrically connected to the lighting module 13 and the driving module 14, and configured to control the driving module 14 to drive the lighting module 13 to rotate horizontally or/and vertically, or control the lighting module 13 to turn on or turn off the irradiation light source. In the embodiment, the control motherboard 15 further includes a control internal code 151, which is pre-stored in a memory (not shown) thereof. The control internal code 151 is configured to be issued through a wireless communication module 152 within a control distance M (e.g., 5 meters) when a pairing process is activated and lasts for example 10 minutes. In normal operation and use, the wireless communication module 152 of the control motherboard 15 is allowed to receive a control signal based on the control internal code 151 for controlling the driving module 14 and the lighting module 13. In the embodiment, the at least one wireless remote controller 20 includes a microcontroller unit 22. When the pairing process is activated and lasts 10 minutes, the wireless remote controller 20 located within the control distance M (e.g., 5 meters) receives the control internal code 151 issued by the wireless communication module 152 of the control motherboard 15 through the wireless communication module 23 thereof, and then the control internal code 151 received is stored in a memory 221 thereof. After storing the control internal code 151 in the memory 221, the wireless remote controller 20 is allowed to send the control signal to the control motherboard 15 through the wireless communication module 23, so that the control motherboard 15 can correspondingly control the lighting module 13 and the driving module 14.

In the embodiment, the wireless communication module 152 of the control motherboard 15 and the wireless communication module 23 of the wireless remote controller 20 transmit the control internal code 151 and the control signal through radio frequency (RF). Based on the aforementioned wireless remote controller pairing system 1 for marine searchlight, the present disclosure also provides a wireless remote controller pairing method for marine searchlight. The pairing method is completed through the following steps.

In the embodiment, the structure of the main body assembly 10 fixed at the high point of the front edge of the ship hull is as mentioned above, including the base 11, the lighting module 13, the driving module 14 and the control main board 15. Preferably but not exclusively, the base 11 and the housing 12 are made of aluminum alloy. Preferably but not exclusively, in the embodiment, the base 11 is further fixed at the high point of the front edge of the ship hull through a waterproof gasket, so that the lighting module 13 disposed on the housing 12 faces forward. Certainly, the present disclosure is not limited thereto. The driving module 14 is disposed between the base 11 and the lighting module 13 and configured to drive the lighting module 13. The control motherboard 15 is received in an accommodation space 110 the base 11, electrically connected to the lighting module 13 and the driving module 14, and configured to control the driving module 14 and the lighting module 13.

Notably, the control motherboard 15 further includes the control internal code 151 pre-stored in the memory (not shown) thereof.

In the embodiment, the power required for the main body assembly 10 is provided by an external power cord 9. When the main body assembly 10 is powered on, the control motherboard 15 is started to activate the pairing process. Preferably but not exclusively, the pairing process is activated and lasts 10 minutes, and the control internal code 151 is issued through the wireless communication module 152. The control internal code 151 is issued continuously in an effective range, that is within the control distance M. Preferably but not exclusively, the control distance M refers to the range of 5 meters away from the main body assembly 10.

After the control motherboard 15 starts the pairing process (e.g., within 10 minutes) and continuously issues the control internal code 151 within the effective control distance M (e.g., 5 meters), any wireless remote controller 20 located within the control distance M is allowed to receive the control internal code 151 from the control motherboard 15 through the wireless communication module 23, and then store the control internal code 151 received into the memory 221 of the microcontroller unit 22, so that the pairing of the main body assembly 10 and the wireless remote controller 20 is completed. After the pairing is completed, the control internal code 151 is stored in the wireless remote controller 20 and there is no need to pair it again. The wireless remote controller 20 with the control internal code 151 stored therein is allowed to send the control signal based on the control internal code 151 to the control motherboard 15, so that the control motherboard 15 can correspondingly control the lighting module 13 and the driving module 14 of the main body assembly 10, and the irradiation angle of the irradiation light source is modulated. In the embodiment, the pairing of the control motherboard 15 of the main body assembly 10 and the wireless remote controller 20 is completed within 10 minutes of the pairing process. After that, the wireless controller 20 can control the main body assembly 10 without pairing again. The entire system is easy to install and easy to use.

Notably, the control motherboard 15 starts pairing with the wireless remote controller 20 and the paring process lasts 10 minutes. After exceeding the 10 minutes of the pairing process, another pairing process needs to be reset and activated for pairing. If the wireless remote controller 20 does not complete pairing within 10 minutes of the pairing process, the control motherboard 15 stops the pairing process and no longer issues the control internal code 151. The control motherboard 15 needs to start activating the pairing process again by powering on the main body assembly 10. In the embodiment, the control motherboard 15 and the wireless remote controller 20 are paired based on the control internal code 151 and the pairing relationship therebetween is not limited to one-to-one exclusive pairing. In that, the overall installation cost is low and the modulation flexibility is high. When a new wireless remote controller 20 needs to be added later, the pairing process only needs to be restarted for pairing, without affecting the wireless remote controller 20 that has been previously paired.

In the embodiment, the wireless remote controller 20 further includes a power button 24, a battery 26 and a displaying module 27. The power required by the wireless remote controller 20 is provided by the battery 26. When the pairing process is activated and the at least one wireless remote controller 20 is located within the control distance M, the user can long press the power button 24 for a pairing time (for example, for 5 seconds), and then the microcontroller unit 22 of at least one wireless remote controller 20 receives the control internal code 151 from the control motherboard 15 through the wireless communication module 23 and stores the internal control code 151 in the memory 221 of the microcontroller unit 22. Preferably but not exclusively, in the embodiment, the displaying module 27 is an LED indicator light. When the user long presses the power button 24 for a pairing time (e.g., for 5 seconds), the LED indicator light of the displaying module 27 starts to flash slowly (e.g., on for 0.3 seconds and off for 0.3 seconds). If the pairing of the wireless remote controller 20 and the main body assembly 10 has been completed, that is, after the control internal code 151 is stored, the LED indicator light of the displaying module 27 is constantly on, so as to indicate that pairing is completed. If the pairing of the wireless remote controller 20 and the main body assembly 10 is not completed, the LED indicator light of the displaying module 27 will flash quickly (e.g., on for 0.1 seconds and off for 0.1 seconds), so as to indicate that the pairing is not completed. At this time, the user can continue to long press the power button 24 for the pairing time (e.g., for 5 seconds), or restart the power of the main body assembly 10 to perform the pairing process again. In other words, the displaying module 27 is configured to indicate whether the wireless remote controller 20 has completed receiving and storing the control internal code 151 during the aforementioned pairing operation. Certainly, the displaying method of the displaying module 27 is not limited to the aforementioned LED indicator light form or other sound and light media form, and the present disclosure is not limited thereto.

Please refer to FIG. 2 to FIG. 4. In the embodiment, the structure of the main body assembly 10 mainly includes the base 11, the driving module 14 and the lighting module 13 disposed on a housing 12. Preferably but not exclusively, the base 11 and the housing 12 are made of aluminum alloy. Preferably but not exclusively, in the embodiment, the base 11 is further fixed to the high front edge of the ship hull through a waterproof gasket, so that the lighting module 13 disposed on the housing 12 faces forward. Certainly, the present disclosure is not limited thereto. In the embodiment, the driving module 14 includes a first driving element 141, a bracket component 142 and a second driving element 143. The first driving element 141 is composed of a motor and a gear set, disposed between the base 11 and a bottom end of the bracket component, and configured to drive the bracket component 142 to rotate horizontally relative to the base 11 with the axis A1 as the center. In addition, the lighting module 13 is disposed on the housing 12. Preferably but not exclusively, the second driving element is also composed of a motor and a gear set, disposed between a top end of the bracket component 142 and the housing 12, and configured to drive the housing 12 (including the lighting module 13) to rotate up and down relative to the bracket component 142 with the axis A2 as the center. Certainly, the way in which the driving module 14 drives the lighting module 13 to modulate the irradiation angle of the irradiation light source is adjustable according to the practical requirements, and the present disclosure is not limited thereto.

Please refer to FIG. 1 to FIG. 5B again. Preferably but not exclusively, in the embodiment, the wireless remote controller 20 includes a power button 24, the displaying module 27 and the microcontroller unit 22, which are disposed on a microcontroller circuit board 21. The wireless remote controller 20 further includes a direction button 25 disposed around the power button 24 and cooperated with microcontroller unit 22 to generated the control signal for controlling operations of the first driving element 141 or/and the second driving element 143, so that the lighting module 13 and the housing 12 are rotated horizontally or/and vertically relative to the base 11, and the irradiation angle of the irradiation light source is modulated. In the embodiment, the power button 24 is used during pairing, and further configured to cooperate with the microcontroller unit 22 to generate the control signal for controlling the lighting module 13 to turn on or turn off the irradiation light source. In addition, the wireless remote controller 20 further includes a speed switch 28 cooperated with the microcontroller unit 22 to generate the control signal for controlling rotational speeds of the lighting module 13 and the housing 12 driven by the first driving element 141 and the second driving element 143 relative to the base 11. Certainly, the functions and the structure of the remote controller 20 can be modified according to the practical requirements, and can have different combinations. The present disclosure is not limited thereto and not redundantly described herein.

Figure 6:
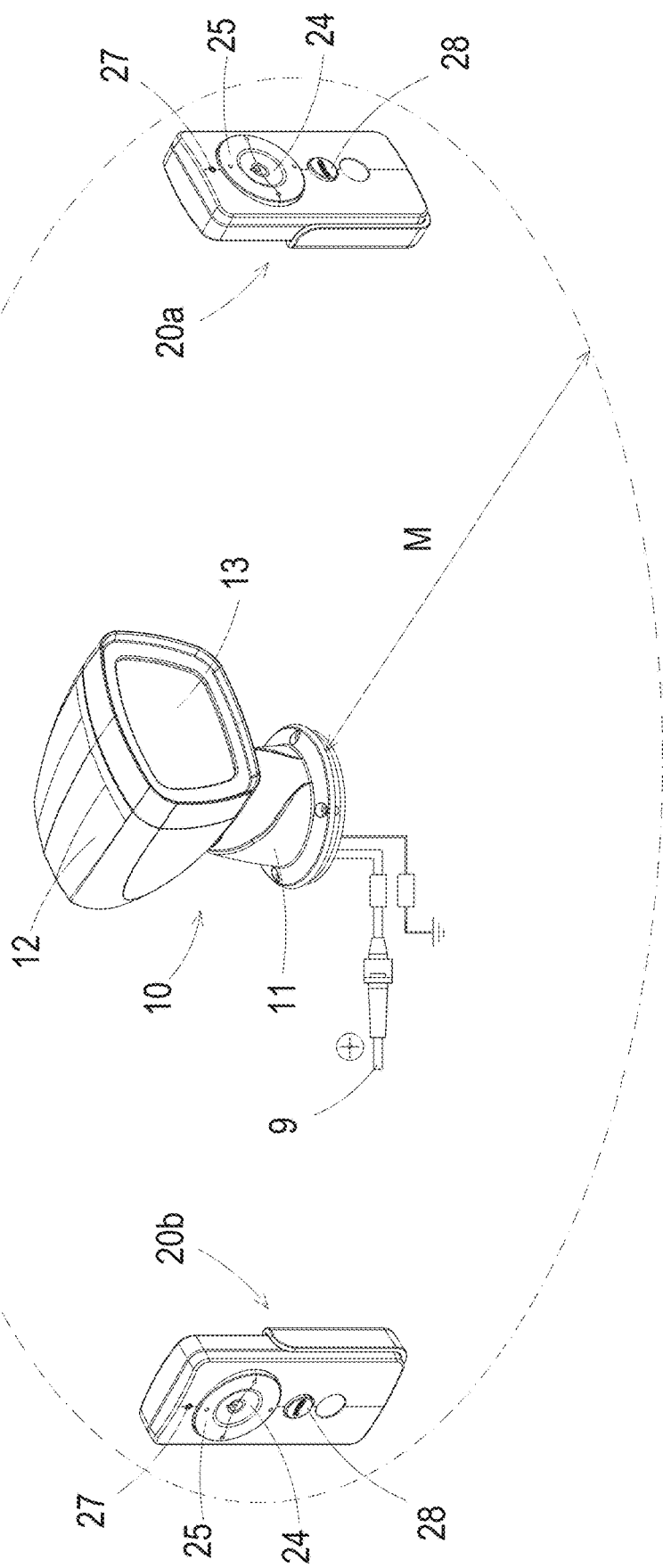
FIG. 6 is a schematic structural diagram showing a wireless remote controller pairing system for marine searchlight according to a second embodiment of the present disclosure.
Figure 7:
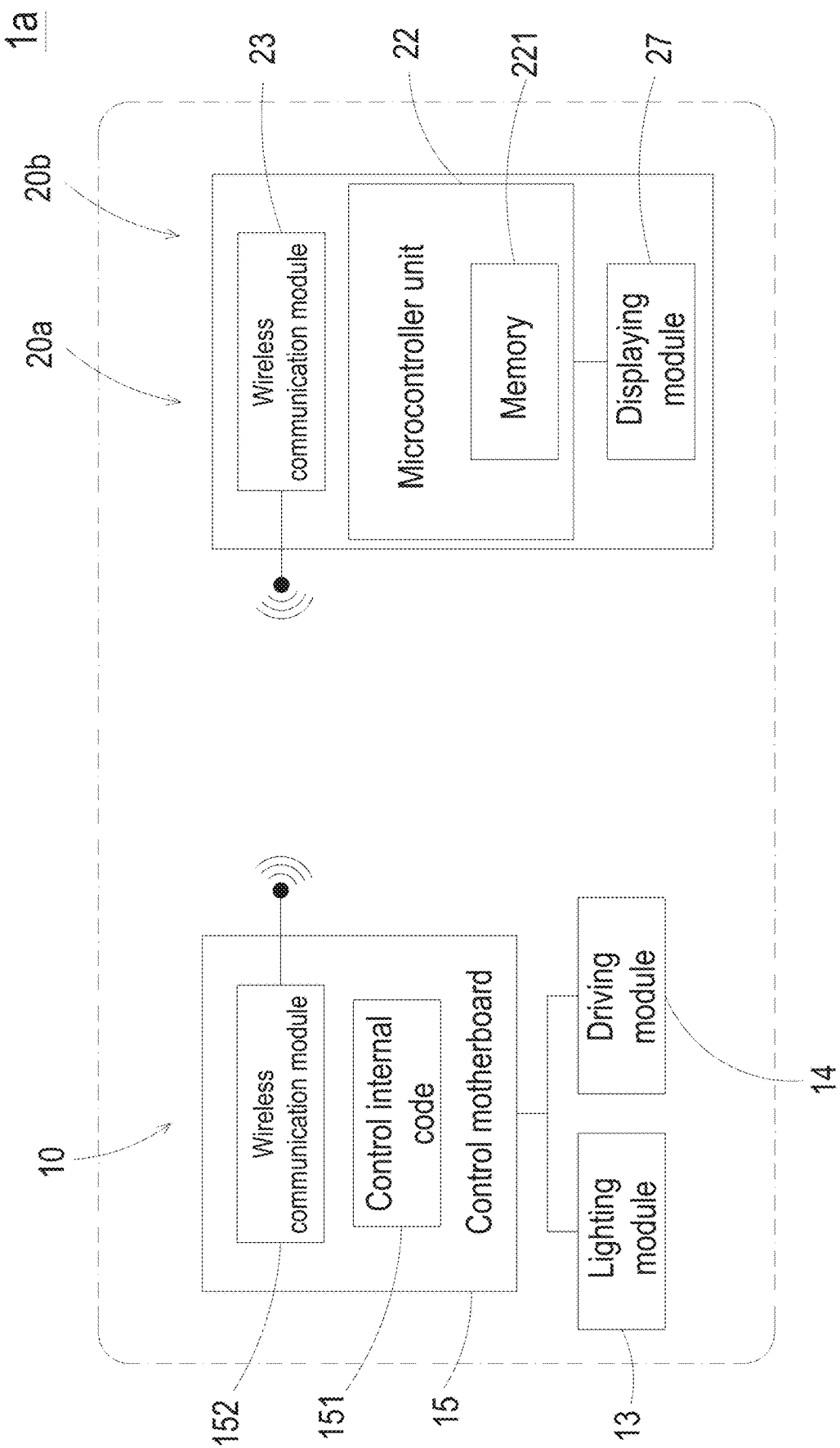
FIG. 7 is a functional block diagram showing the wireless remote controller pairing system for marine searchlight according to the second embodiment of the present disclosure.

FIG. 6 is a schematic structural diagram showing a wireless remote controller pairing system for marine searchlight according to a second embodiment of the present disclosure. FIG. 7 is a functional block diagram showing the wireless remote controller pairing system for marine searchlight according to the second embodiment of the present disclosure. In the embodiment, the structures, elements and functions of the wireless remote controller pairing system 1a for marine searchlight are similar to those of the wireless remote controller pairing system 1 of FIG. 1 to FIG. 5B, and are not redundantly described herein. In the embodiment, the body assembly 10 of the wireless remote controller pairing system 1a for marine searchlight can be paired with the two wireless remote controllers 20a, 20b through the aforementioned pairing method. Preferably but not exclusively, in the embodiment, the wireless communication module 152 of the control motherboard 15 and the wireless communication modules 23 of the two wireless remote controllers 20a, 2b transmit the control internal code 151 and the control signals through Wi-Fi. When the main body assembly 10 is powered on, the control motherboard 15 is started to activate the pairing process. Preferably but not exclusively, the pairing process is activated and lasts 10 minutes, and the control internal code 151 is issued through the wireless communication module 152. The control internal code 151 is issued continuously in an effective range, that is within the control distance M. Preferably but not exclusively, the control distance M refers to the range of 5 meters away from the main body assembly 10. After the control motherboard 15 starts the pairing process (e.g., within 10 minutes) and continuously issues the control internal code 151 within the effective control distance M (e.g., 5 meters), the wireless remote controller 20a first receives the control internal code 151 from the control motherboard 15 through the wireless communication module 23, and then stores the control internal code 151 received into the memory 221 of the microcontroller unit 22, so as to complete the pairing of the main body assembly 10 and the wireless remote controller 20a. In order to avoid interference, the wireless remote controllers 20a, 20b are not paired with the main body assembly 10 at the same time. When the control motherboard 15 has not ended the pairing process (e.g., within 10 minutes) and the wireless remote controller 20b is also located within the effective control distance M (e.g., 5 meters), the wireless remote controller 20b is allowed to receive the control internal code 151 from the control motherboard 15 through the wireless communication module 23 and then store the control internal code 151 received in the memory 221 of the microcontroller unit 22, so as to complete the pairing of the main body assembly 10 and the wireless remote controller 20b. Certainly, the user can restart the power of the main body assembly 10 to activate another pairing process to pair the main body assembly 10 with the wireless remote controller 20b. The present disclosure is not limited thereto. Notably, the control internal code 151 is stored to the wireless remote controllers 20a, 20b to complete the pairing with the main body assembly 10. It is easy to install and convenient to use. The pairing relationship will not disappear when the main body assembly 10 is powered off again, unless the wireless remote controllers 20a, 20b are paired with other devices and the internal control code 151 is deleted.

From the above, the pairing relationship between the main body assembly 10 and the wireless remote controllers 20a, 20b is not limited to one-to-one exclusive pairing. It allows to pair one single main body assembly 10 with a plurality of wireless remote controller 20a, 20b through multiple pairing processes. The plurality of wireless remote controllers 20a, 20b allow sending the control signals to the control motherboard 15 of the main body assembly 10, and the control motherboard 15 can confirm the control priority of the plurality of wireless remote controllers 20a, 20b based on the control signals received, so that the control flexibility of the marine searchlights is improved. The present disclosure allows to establish a pairing relationship between the main body assembly 10 and the wireless remote controllers 20a, 20b by issuing and storing the control internal code 151. It helps to solve the inconvenience of using the conventional remote controllers. Moreover, the paring relationship between the main body assembly 10 and the wireless remote controllers 20a, 20b is adjustable according to the practical requirements. Certainly, the control motherboard 15 of the main body assembly 110 can determine the control priority of the plurality of wireless remote controllers 20a, 20b according to the control signals received based on the control internal code 151, so as to modulate the irradiation angle of the irradiation light source. Since the pairing of the wireless remote controllers 20a, 20b and the control motherboard 15 does not require complicated wire installation, the wireless remote controllers 20a, 20b allow operating the direction buttons 25, the power button 24 or the speed switches 28 to generate the control signals for transmitting based on the control internal code 151 stored therein, and then the control signals are received and confirmed by the control motherboard 15. Thereby, the driving module 14 with at least two degrees of freedom is controlled to drive the lighting module 13 to rotate horizontally and vertically relative to the base 11, and the irradiation angle of the irradiation light source is modulated.

Figure 8:
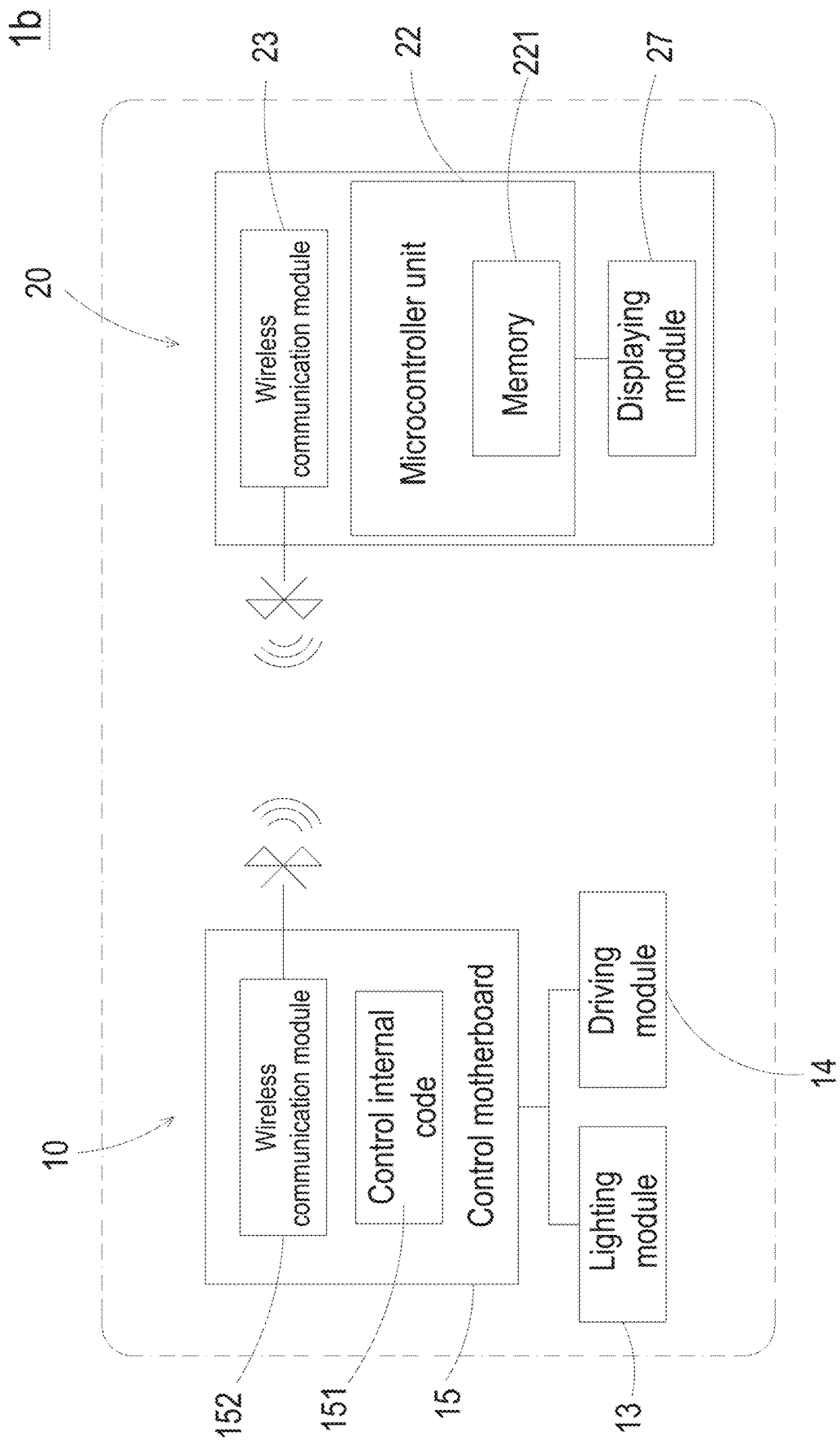
FIG. 8 is a functional block diagram showing the wireless remote controller pairing system for marine searchlight according to a third embodiment of the present disclosure.

FIG. 8 is a functional block diagram showing the wireless remote controller pairing system for marine searchlight according to a third embodiment of the present disclosure. In the embodiment, the structures, elements and functions of the wireless remote controller pairing system 1b for marine searchlight are similar to those of the wireless remote controller pairing system 1 of FIG. 1 to FIG. 5B, and are not redundantly described herein. In the embodiment, the body assembly 10 of the wireless remote controller pairing system 1b for marine searchlight can be paired with the wireless remote controller 20 through the aforementioned pairing method. Preferably but not exclusively, in the embodiment, the wireless communication module 152 of the control motherboard 15 and the wireless communication module 23 of the wireless remote controller 20 transmit the control internal code 151 and the control signals through Bluetooth. Certainly, the transmission method of the control internal code 151 and the control signal is adjustable according to the practical requirements and not limited to one single transmission method. The present disclosure is not limited thereto and not redundantly described herein.

In summary, the present disclosure provides a wireless remote controller paring system for marine searchlight and a method thereof for facilitating the installation and effectively increasing the flexibility of operations. The control motherboard in the main body assembly has a control internal code. The control internal code is issued within a control distance when a pairing process is activated. The control motherboard is allowed to receive a control signal based on the control internal code for controlling a driving module to drive a lighting module in the main body assembly When the pairing process is activated, the wireless remote controller located within the control distance can receive and store the control internal code into the memory by long pressing the power button to complete the pairing process. The wireless remote controller having the control internal code stored therein allows sending the control signal to the control motherboard based on the control internal code, so that the control motherboard can correspondingly control the lighting module and the driving module of the main body assembly to adjust an irradiation angle of the irradiation light source. The control motherboard of the main body assembly and the microcontroller unit of the wireless remote controller are in communication through radio frequency (RF), Wi-Fi or Bluetooth. After the pairing is completed, the control internal code is stored in the wireless remote controller and there is no need to pair it again. It is easy to install and easy to use. Through the pairing method, the wireless remote controller is easy to repair or replace. In addition, the pairing of the main body assembly and the wireless remote controller is not limited to one-to-one. It allows to pair one single main body assembly with a plurality of wireless remote controller through multiple pairing processes. The plurality of wireless remote controllers allow sending the control signals to the control motherboard of the main body assembly, and the control motherboard can confirm the control priority of the plurality of wireless remote controllers based on the control signals received, so that the control flexibility of marine searchlights is improved. By issuing and storing the control internal code to establish a pairing relationship between the main body assembly and the wireless remote controller, it helps to solve the inconvenience of using the conventional remote controllers. Moreover, the paring relationship between the main body assembly and the wireless remote controller is adjustable according to the practical requirements. The control motherboard can determine the control priority of the plurality of wireless remote controllers based on the control internal code, so as to modulate the irradiation angle of the irradiation light source. The pairing of the wireless remote controller and the control motherboard does not require complicated wire installation. The wireless remote controller allows operating the direction buttons or the speed switches to generate the control signal for transmitting based on the control internal code stored therein, and then the control signal is received and confirmed by the control motherboard. Thereby, the driving module with at least two degrees of freedom is controlled to drive the lighting module to rotate horizontally and vertically relative to the base, and the irradiation angle of the irradiation light source is modulated. On the other hand, the control motherboard and the wireless remote controller are paired based on the control internal code and the pairing relationship therebetween is not limited to one-to-one exclusive pairing. The overall installation cost is low and the modulation flexibility is high. In addition, the pairing method of the control motherboard and the wireless remote controller can also be used to quickly find the faulty components. The damaged remote controller can also be directly replaced and paired again. Certainly, the number of the wireless remote controllers paired with the signal main body assembly is adjustable according to the practical requirements, so as to increase the control flexibility of the marine searchlight system, and improve the industrial utilization.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless remote controller pairing system for marine searchlight comprising:
a main body assembly comprising:
a base configured to fix to a ship hull;
a lighting module configured to provide an irradiation light source;
a driving module disposed between the base and the lighting module and configured to drive the lighting module to modulate an irradiation angle of the irradiation light source; and
a control motherboard received in the base, electrically connected to the lighting module and the driving module, and configured to control the driving module and the lighting module, wherein the control motherboard further includes a control internal code, and the control internal code is issued within a control distance when a pairing process is activated, wherein the control motherboard is allowed to receive a control signal based on the control internal code for controlling the driving module to drive the lighting module; and
at least one wireless remote controller comprising a microcontroller unit for receiving the control internal code within the control distance when the pairing process is activated and then storing the control internal code in a memory, wherein the wireless remote controller is allowed to send the control signal to the control motherboard, so that the control motherboard correspondingly controls the lighting module and the driving module.

2. The wireless remote controller pairing system for marine searchlight according to claim 1, wherein each of the control motherboard and the at least one wireless remote controller comprises a wireless communication module, and the wireless communication modules transmit the control internal code and the control signal through radio frequency (RF), Wi-Fi or Bluetooth.

3. The wireless remote controller pairing system for marine searchlight according to claim 1, wherein the lighting module is disposed on a housing, and the driving module comprises a first driving element, a bracket component and a second driving element, wherein the first driving element is disposed between the base and a bottom end of the bracket component, and configured to drive the bracket component to rotate horizontally relative to the base, wherein the second driving element is disposed between a top end of the bracket component and the housing, and configured to drive the housing to rotate up and down relative to the bracket component.

4. The wireless remote controller pairing system for marine searchlight according to claim 3, wherein the at least one wireless remote controller comprises a direction button cooperated with the microcontroller unit to generate the control signal for controlling operations of the first driving element or/and the second driving element, so that the lighting module and the housing are rotated horizontally or/and vertically relative to the base, and the irradiation angle of the irradiation light source is modulated.

5. The wireless remote controller pairing system for marine searchlight according to claim 3, wherein the at least one wireless remote controller comprises a power button cooperated with the microcontroller unit to generate the control signal for controlling the lighting module to turn on or turn off the irradiation light source.

6. The wireless remote controller pairing system for marine searchlight according to claim 5, wherein when the pairing process is activated, the at least one wireless remote controller located within the control distance receives and stores the control internal code into the memory by long pressing the power button, so as to complete the pairing process.

7. The wireless remote controller pairing system for marine searchlight according to claim 3, wherein the at least one wireless remote controller comprises a speed switch cooperated with the microcontroller unit to generate the control signal for controlling rotational speeds of the lighting module and the housing driven by the first driving element and the second driving element relative to the base.

8. A wireless remote controller pairing method for marine searchlight, comprising steps of:
(a) providing a main body assembly comprising a base, a lighting module, a driving module and a control motherboard, wherein the driving module is disposed between the base and the lighting module and configured to drive the lighting module, and the control motherboard is received in the base, electrically connected to the lighting module and the driving module, and configured to control the driving module and the lighting module, wherein the control motherboard further includes a control internal code, and the control motherboard is allowed to receive a control signal based on the control internal code for controlling the driving module to drive the lighting module;
(b) activating a pairing process through the control motherboard and issuing the control internal code within a control distance;
(c) providing at least one wireless remote controller, wherein when the pairing process is activated, the at least one wireless remote controller located within the control distance receives the control internal code and stores the control internal code into the memory; and
(d) stopping the pairing process through the control motherboard, and allowing the control motherboard to receive a control signal transmitted from the at least one wireless remote controller having the control internal code stored therein, so that the control motherboard correspondingly controls the lighting module and the driving module.

9. The wireless remote controller pairing method for marine searchlight according to claim 8, wherein when the main body assembly is powered on, the control motherboard is started to activate the pairing process and issue the control internal code in the step (b).

10. The wireless remote controller pairing method for marine searchlight according to claim 8, wherein a power button of the at least one wireless remote controller located within the control distance is long pressed for a pairing time, so as to receive and store the control internal code.

11. The wireless remote controller pairing method for marine searchlight according to claim 10, wherein the pairing process lasts 10 minutes, the control distance is 5 meters, and the pairing time is 5 seconds.

12. The wireless remote controller pairing method for marine searchlight according to claim 8, wherein the at least one wireless remote controller comprises a displaying module configured to indicate whether the at least one wireless remote controller has completed receiving and storing the control internal code in the step (c).

13. The wireless remote controller pairing method for marine searchlight according to claim 8, wherein each of the control motherboard and the at least one wireless remote controller comprises a wireless communication module, and the wireless communication modules transmit the control internal code and the control signal through radio frequency (RF), Wi-Fi or Bluetooth.

14. The wireless remote controller pairing method for marine searchlight according to claim 8, wherein the lighting module is disposed on a housing, and the driving module comprises a first driving element, a bracket component and a second driving element, wherein the first driving element is disposed between the base and a bottom end of the bracket component, and configured to drive the bracket component to rotate horizontally relative to the base, wherein the second driving element is disposed between a top end of the bracket component and the housing, and configured to drive the housing to rotate up and down relative to the bracket component.

15. The wireless remote controller pairing method for marine searchlight according to claim 14, wherein the at least one wireless remote controller comprises a direction button cooperated with the microcontroller unit to generate the control signal for controlling operations of the first driving element or/and the second driving element, so that the lighting module and the housing are rotated horizontally or/and vertically relative to the base, and the irradiation angle of the irradiation light source is modulated.

16. The wireless remote controller pairing method for marine searchlight according to claim 14, wherein the at least one wireless remote controller comprises a power button cooperated with the microcontroller unit to generate the control signal for controlling the lighting module to turn on or turn off the irradiation light source.

17. The wireless remote controller pairing method for marine searchlight according to claim 16, wherein the at least one wireless remote controller located within the control distance receives and stores the control internal code into the memory by long pressing the power button in the step (c).

18. The wireless remote controller pairing method for marine searchlight according to claim 14, wherein the at least one wireless remote controller comprises a speed switch cooperated with the microcontroller unit to generate the control signal for controlling rotational speeds of the lighting module and the housing driven by the first driving element and the second driving element relative to the base.

* * * * *